(12) United States Patent
Cheng et al.

(10) Patent No.: US 12,351,694 B2
(45) Date of Patent: Jul. 8, 2025

(54) THERMOPLASTIC ELASTOMER COMPOSITION, FOAMED MATERIAL AND MANUFACTURING METHOD THEREOF

(71) Applicant: TSRC Corporation, Kaohsiung (TW)

(72) Inventors: Wen Wei Cheng, Kaohsiung (TW); Hsi-Hsin Shih, Kaohsiung (TW); Chia-Hung Hsu, Kaohsiung (TW); Yu Tsan Tseng, Kaohsiung (TW)

(73) Assignee: TSRC Corporation, Kaohsiung (TW)

( * ) Notice: Subject to any disclaimer, the term of this patent is extended or adjusted under 35 U.S.C. 154(b) by 270 days.

(21) Appl. No.: 17/025,875

(22) Filed: Sep. 18, 2020

(65) Prior Publication Data

US 2021/0087347 A1 Mar. 25, 2021

Related U.S. Application Data

(60) Provisional application No. 62/902,573, filed on Sep. 19, 2019.

(51) Int. Cl.
| | | |
|---|---|---|
| *C08L 31/04* | (2006.01) | |
| *C08J 3/12* | (2006.01) | |
| *C08J 9/00* | (2006.01) | |
| *C08J 9/06* | (2006.01) | |
| *C08J 9/12* | (2006.01) | |
| *C08L 23/0853* | (2025.01) | |
| *C08L 53/02* | (2006.01) | |

(52) U.S. Cl.
CPC ............ *C08J 9/0061* (2013.01); *C08J 3/12* (2013.01); *C08J 9/06* (2013.01); *C08J 9/122* (2013.01); *C08L 23/0853* (2013.01); *C08L 31/04* (2013.01); *C08L 53/02* (2013.01); *C08J 2203/06* (2013.01); *C08J 2203/08* (2013.01); *C08J 2323/08* (2013.01); *C08J 2331/04* (2013.01); *C08J 2353/00* (2013.01); *C08J 2353/02* (2013.01); *C08J 2423/08* (2013.01); *C08J 2431/04* (2013.01); *C08J 2453/00* (2013.01); *C08J 2453/02* (2013.01); *C08L 2203/14* (2013.01); *C08L 2205/025* (2013.01); *C08L 2205/03* (2013.01); *C08L 2205/06* (2013.01); *C08L 2207/04* (2013.01); *C08L 2312/00* (2013.01)

(58) Field of Classification Search
CPC ..... C08J 9/0061; C08J 3/12; C08J 9/06; C08J 9/122; C08J 2203/06; C08J 2203/08; C08J 2323/08; C08J 2331/04; C08J 2353/00; C08J 2353/02; C08J 2423/08; C08J 2431/04; C08J 2453/00; C08J 2453/02; C08J 2423/16; C08J 9/0023; C08J 9/228; C08L 23/0853; C08L 31/04; C08L 53/02; C08L 2203/14; C08L 2205/025; C08L 2205/03; C08L 2205/06; C08L 2207/04; C08L 2312/00; C08L 2207/02; C08L 23/08; C08L 9/00; C08L 21/00; C08L 23/16; C08L 27/06; C08L 53/00; A43B 13/04; C08K 5/14; B29C 44/42

See application file for complete search history.

(56) References Cited

U.S. PATENT DOCUMENTS

| | | | | |
|---|---|---|---|---|
| 4,680,317 | A * | 7/1987 | Kuhnel | C08J 9/0061 264/300 |
| 5,971,870 | A * | 10/1999 | Sullivan | A63B 37/0003 473/373 |
| 9,493,623 | B2 * | 11/2016 | Shimizu | A43B 13/04 |
| 2007/0129454 | A1 * | 6/2007 | Su | C08J 9/0061 521/142 |
| 2012/0322905 | A1 * | 12/2012 | Kusanose | C08L 23/0853 521/139 |
| 2015/0038606 | A1 * | 2/2015 | Baghdadi | B29C 44/3446 521/137 |
| 2016/0168345 | A1 * | 6/2016 | Eschenbacher | B32B 27/32 264/510 |
| 2017/0181498 | A1 * | 6/2017 | Whelan | C08J 9/08 |

FOREIGN PATENT DOCUMENTS

| | | |
|---|---|---|
| CN | 106905599 A | 6/2017 |
| CN | 109517262 A | 3/2019 |
| CN | 109679264 A | 4/2019 |
| EP | 2231755 | 9/2010 |
| EP | 2825585 | 1/2015 |
| EP | 2938670 | 11/2015 |
| KR | 10-2014-0146065 A | 12/2014 |
| KR | 101574638 | * 12/2015 |
| KR | 10-2017-0059152 A | 5/2017 |
| TW | 10-2014-0146065 A | 12/2014 |
| TW | 201512264 A | 4/2015 |
| TW | 10-2017-0059152 A | 5/2017 |

(Continued)

OTHER PUBLICATIONS

English machine translation of KR101574638 (Year: 2015).*
Dow Infuse 9530 Tech. Data Sheet (Year: 2016).*
Dow Engae 8003 POE MatWeb (Year: 2015).*
Data Sheet for Nordel 3720P from Dow. (Year: 2024).*
Translation of TWI 64726B. Zheng et al. (Year: 2019).*
Data sheet for Nordel IP 4750. (Year: 2012).*
Taiwanese Search Report mailed 2020-04-30 in corresponding Taiwanese Application No. 109132257.
Extended European Search Report mailed Mar. 24, 2021 in corresponding European Application No. 20000335.8.

(Continued)

*Primary Examiner* — K. Boyle
(74) *Attorney, Agent, or Firm* — Snell & Wilmer L.L.P.

(57) ABSTRACT

The present invention provides a thermoplastic elastomer composition for foaming. The thermoplastic elastomer composition comprises: (A) an ethylene-based copolymer; (B) an olefin block copolymer; (C) an unsaturated aliphatic rubber; and (D) a crosslinking agent. The olefin block copolymer is different from the ethylene-based copolymer. The weight ratio of the unsaturated aliphatic rubber (C) to the olefin block copolymer (B) is 1:1.5 to 1:5.

19 Claims, No Drawings

(56) References Cited

FOREIGN PATENT DOCUMENTS

| TW | 201827500 | A | 8/2018 |
|---|---|---|---|
| TW | 201922893 | A | 6/2019 |
| TW | 201934625 | A | 9/2019 |
| TW | I647262 | * | 9/2019 |
| TW | 202012528 | A | 4/2020 |

OTHER PUBLICATIONS

KIPO; Office Action mailed Dec. 2, 2021 in corresponding Korean Application No. 10-2020-0120892.
Taiwanese Office Action mailed 2021-12-02 in corresponding Taiwanese Application No. 10-2020-0120892.

* cited by examiner

THERMOPLASTIC ELASTOMER COMPOSITION, FOAMED MATERIAL AND MANUFACTURING METHOD THEREOF

CROSS-REFERENCE TO RELATED APPLICATION

This application claims the benefit of U.S. Provisional Application No. 62/902,573, filed Sep. 19, 2019, and entitled THERMOPLASTIC ELASTOMER COMPOSITION AND FOAMED MATERIAL THEREOF, the contents of which are hereby incorporated herein by reference, to the extent such contents do not conflict with the present disclosure.

BACKGROUND OF THE INVENTION

Field of the Invention

The present invention relates to a thermoplastic elastomer composition, particularly to a composition containing an ethylene-based copolymer, for manufacturing a foamed material.

Description of the Prior Art

Products with reduced weight have become a key target for the development of various industries around the world. The foamed material has also continued to attract attention, and has been widely used in automobile-related parts, construction-related materials, various package cushioning materials, livelihood products, sporting goods, etc. Therefore, the properties of the foamed material, such as flexibility, cushioning, rebound, light weight, etc., are gradually be asked for. The strength of the foamed material will decrease significantly as the density decreases, making its physical properties insufficient for specific applications. At present, the foamed materials with relatively high structural strength are mostly obtained through chemically cross-linking and foaming, which still has limited improvement in foamed material performance.

Supercritical fluid foaming is one of the technologies that have achieved lightweight materials in recent years and is more environmentally friendly. At a specific temperature and pressure, gases such as nitrogen or carbon dioxide are dissolved in the polymer in a supercritical state, and then the pressure is released to nucleate the bubbles, thereby making the material lighter. However, the use of supercritical fluid for foaming also has the problem of reduced foamed material performance after foaming. Therefore, improving the foamed material performance still continuously keeps as topics in research. In recent years, high-performance elastomer materials, such as TPEE, TPU, and TPAE, have gradually been used for supercritical fluid foaming. However, such materials are expensive and have poor market competitiveness, and a mixture with other materials for cost down cannot reach the best performance of foamed materials.

It is also known that low-priced ethylene-based copolymers are used to make foamed materials, such as those described in U.S. Pat. No. 9,879,133B2, TWI647262, U.S. Ser. No. 10/626,259B2, U.S. Pat. No. 9,260,578B2, TWI665242, and U.S. Pat. No. 9,493,623B2. However, these foamed materials still have various disadvantages.

SUMMARY OF THE INVENTION

The present invention provides a thermoplastic elastomer composition, which can be manufactured into a foamed material. A specific gravity of the foamed material is less than or equal to 0.2, preferably less than or equal to 0.16. In a preferred embodiment, a specific gravity of the foamed material is less than or equal to 0.16, a vertical rebound of the foamed material is equal to or more than 70%, and a compression set of the foamed material is less than or equal to 35%.

In one embodiment, the present invention provides a thermoplastic elastomer composition for foaming. The thermoplastic elastomer composition comprises: (A) an ethylene-based copolymer; (B) an olefin block copolymer; (C) an unsaturated aliphatic rubber; and (D) a crosslinking agent. The olefin block copolymer is different from the ethylene-based copolymer. The weight ratio of the unsaturated aliphatic rubber (C) to the olefin block copolymer (B) is 1:1.5 to 1:5.

In one embodiment, the present invention provides the thermoplastic elastomer composition as described above, wherein the composition comprises 20-45 wt % of the ethylene-based copolymer (A), 30-50 wt % of the olefin block copolymer (B) and 10-25 wt % of the unsaturated aliphatic rubber (C), based on a total weight of the thermoplastic elastomer composition.

In one embodiment, the present invention provides the thermoplastic elastomer composition as described above, wherein the composition comprises 30-45 wt % of the ethylene-based copolymer (A), 35-50 wt % of the olefin block copolymer (B) and 10-20 wt % of the unsaturated aliphatic rubber (C), based on the total weight of the thermoplastic elastomer composition.

In one embodiment, the present invention provides the thermoplastic elastomer composition as described above, wherein the composition comprises 30-40 wt % of the ethylene-based copolymer (A) and 40-50 wt % of the olefin block copolymer (B) and 10-20 wt % of the unsaturated aliphatic rubber (C), based on the total weight of the thermoplastic elastomer composition.

In one embodiment, the present invention provides the thermoplastic elastomer composition as described above, wherein the composition comprises 15-20 wt % of the unsaturated aliphatic rubber (C), based on the total weight of the thermoplastic elastomer composition.

In one embodiment, the present invention provides the thermoplastic elastomer composition as described above, wherein the composition does not contain any acrylic metal salt.

In one embodiment, the present invention provides the thermoplastic elastomer composition as described above, wherein the ethylene-based copolymer (A) is selected from an ethylene-based copolymer with a carbonyl group, an ethylene-α-olefin random copolymer and a combination thereof.

In one embodiment, the present invention provides the thermoplastic elastomer composition as described above, wherein the ethylene-based copolymer with a carbonyl group is ethylene/vinyl acetate copolymer, ethylene/methyl methacrylate copolymer, ethylene/butyl methacrylate copolymer, ethylene/butyl acrylate copolymer, ethylene/ethyl acrylate copolymer, ethylene/acrylic acid copolymer, ethylene/acrylic acid ionomer or a mixture thereof.

In one embodiment, the present invention provides the thermoplastic elastomer composition as described above, wherein the ethylene-α-olefin random copolymer is ethylene-propylene random copolymer, ethylene-1-butene random copolymer, ethylene-1-hexene random copolymer, ethylene-1-heptene random copolymer, ethylene-1-octene random copolymer, ethylene-4-methyl-1-pentene random copolymer, ethylene-1-nonene random copolymer, ethylene-1-decene random copolymer, chlorinated polyethylene propylene-butylene random copolymer, a modified derivatives thereof, or a mixture thereof.

In one embodiment, the present invention provides the thermoplastic elastomer composition as described above, wherein the olefin block copolymer (B) is ethylene-α-olefin block copolymer.

In one embodiment, the present invention provides the thermoplastic elastomer composition as described above, wherein the unsaturated aliphatic rubber (C) is ethylene-propylene-diene monomer rubber, butadiene rubber, butyl rubber, isoprene rubber or a mixture thereof.

In one embodiment, the present invention provides the thermoplastic elastomer composition as described above, wherein the ethylene-based copolymer (A) is ethylene/vinyl acetate copolymer, ethylene-α-olefin random copolymer or a mixture thereof; the olefin block copolymer (B) is ethylene-α-olefin block copolymer; and the unsaturated aliphatic rubber (C) is ethylene-propylene-diene monomer rubber.

In one embodiment, the present invention provides the thermoplastic elastomer composition as described above, wherein a density range of the ethylene/vinyl acetate copolymer is 0.935-0.955 g/cm$^3$; a vinyl acetate (VA) content range of the ethylene/vinyl acetate copolymer is 14-35 wt %; the ethylene-α-olefin random copolymer is an ethylene-1-butene random copolymer, an ethylene-1-hexene random copolymer or an ethylene-1-octene random copolymer, a density range of the ethylene-α-olefin random copolymer is 0.870-0.910 g/cm$^3$, and a hardness range of the ethylene-α-olefin random copolymer is 70-95 A.

In one embodiment, the present invention provides the thermoplastic elastomer composition as described above, wherein the ethylene-α-olefin block copolymer is an ethylene-1-octene block copolymer, a density range of the ethylene-1-octene block copolymer is 0.860-0.890 g/cm$^3$, and a hardness range of the ethylene-1-octene block copolymer is 60-85 A.

In one embodiment, the present invention provides the thermoplastic elastomer composition as described above, wherein a density range of the ethylene-propylene-diene monomer rubber is 0.870-0.910 g/cm$^3$, an ethylene content range of the ethylene-propylene-diene monomer rubber is 60-85% by mass, and a weight average molecular weight range of the ethylene-propylene-diene monomer rubber is 100,000 to 200,000.

In one embodiment, the present invention provides the thermoplastic elastomer composition as described above, wherein the crosslinking agent (D) is selected from the group consisting of dicumyl peroxide, di-tert-butyl peroxide, 2,5-dimethyl-2,5-di(tert-butylperoxy)hexane, 2,5-di(tert-butylperoxy)-2,5-dimethyl-3-hexyne), di(tert-butylperoxyisopropyl)benzene, 1,1-di-(tert-butylperoxy)-3,3,5-trimethylcyclohexane), butyl 4,4-bis(tert-butyldioxy) valerate, benzoyl peroxide, p-chlorobenzoyl peroxide, 2,4-dichlorobenzoyl peroxide, tert-butyl peroxybenzoate, tert-butylperoxy isopropyl carbonate, diacetyl peroxide, lauroyl peroxide, tert-butyl cumyl peroxide, tert-butylperoxy 2-ethylhexyl carbonate and a mixture thereof.

In one embodiment, the present invention provides the thermoplastic elastomer composition as described above, wherein the thermoplastic elastomer composition comprises 0.1-1 parts by weight of the crosslinking agent (D), based on 100 parts by weight of a total weight of the ethylene-based copolymer (A), the olefin block copolymer (B) and the unsaturated aliphatic rubber (C).

In one embodiment, the present invention provides the thermoplastic elastomer composition as described above, wherein the thermoplastic elastomer composition further comprises a vinyl aromatic based copolymer.

In one embodiment, the present invention provides the thermoplastic elastomer composition as described above, wherein the vinyl aromatic based copolymer is a partially hydrogenated copolymer, a fully hydrogenated copolymer or a combination thereof.

In one embodiment, the present invention provides the thermoplastic elastomer composition as described above, wherein the vinyl aromatic based copolymer is Styrene-Ethylene-Butylene-Styrene (SEBS) block copolymer, Styrene-Ethylene-Propylene-Styrene (SEPS) block copolymer, Styrene-Ethylene-Ethylene-Propylene-Styrene (SEEPS) block copolymer, Styrene-Ethylene-Butylene (SEB) block copolymer, Styrene-Ethylene-Propylene (SEP) block copolymer or a combination thereof.

In one embodiment, the present invention provides the thermoplastic elastomer composition as described above, wherein the vinyl aromatic based copolymer is Styrene-Butadiene-Styrene (SBS) block copolymer, Styrene-Isoprene-Styrene (SIS) block copolymer, Styrene-(Isoprene/Butadiene)-Styrene (S-(I/B)-S) block copolymer, Solution Styrene-Butadiene Rubber (SSBR), Styrene-Butadiene (SB) block copolymer, Styrene-Isoprene (SI) block copolymer or a combination thereof.

In one embodiment, the present invention provides the thermoplastic elastomer composition as described above, wherein a highest peak molecular weight of the vinyl aromatic based copolymer is 80,000 to 500,000 grams per mole, more preferably 90,000 to 450,000 grams per mole, and most preferably 90,000 to 350,000 grams per mole.

In one embodiment, the present invention provides the thermoplastic elastomer composition as described above, wherein a vinyl aromatic monomer content of the vinyl aromatic based copolymer ranges from 15 to 35 wt %.

In one embodiment, the present invention provides the thermoplastic elastomer composition as described above, wherein the thermoplastic elastomer composition further comprises a plasticizer, and a weight ratio of the vinyl aromatic based copolymer to the plasticizer is 2:1 to 1:2.

In one embodiment, the present invention provides the thermoplastic elastomer composition as described above, wherein the plasticizer is selected from paraffin oil, naphthenic oil, aromatic oil and a composition thereof.

In one embodiment, the present invention provides the thermoplastic elastomer composition as described above, wherein the thermoplastic elastomer composition comprises 20-35 wt % of the ethylene-based copolymer (A), 30-45 wt % of the olefin block copolymer (B), 10-20 wt % of the unsaturated aliphatic rubber (C), and 3-25 wt % of the vinyl aromatic based copolymer, based on the total weight of the thermoplastic elastomer composition.

In one embodiment, the present invention provides the thermoplastic elastomer composition as described above, wherein the thermoplastic elastomer composition comprises 35-45 wt % of the olefin block copolymer (B), 15-20 wt % of the unsaturated aliphatic rubber (C), and 5-20 wt % of the vinyl aromatic based copolymer, based on the total weight of the thermoplastic elastomer composition.

In one embodiment, the present invention provides the thermoplastic elastomer composition as described above, wherein the thermoplastic elastomer composition comprises 5-10 wt % of the vinyl aromatic based copolymer, based on the total weight of the thermoplastic elastomer composition.

In one embodiment, the present invention provides the thermoplastic elastomer composition as described above, wherein the thermoplastic elastomer composition is used for supercritical fluid foaming.

In one embodiment, the present invention provides the thermoplastic elastomer composition as described above, wherein the thermoplastic elastomer composition further comprises a chemical foaming agent.

In one embodiment, the present invention provides a compounded product, which is manufactured by mixing and melting any one of the thermoplastic elastomer compositions as described above.

In one embodiment, the present invention provides a foamed material, which is prepared from any one of the thermoplastic elastomer composition as described above.

In one embodiment, the present invention provides the foamed material as described above, wherein a specific gravity of the foamed material is less than or equal to 0.2, a vertical rebound of the foamed material is equal to or more than 70%, and a compression set of the foamed material is less than or equal to 35%.

In one embodiment, the present invention provides the foamed material as described above, wherein the specific gravity of the foamed material is less than or equal to 0.16, and the vertical rebound of the foamed material is equal to or more than 70%, and a compression set of the foamed material is less than or equal to 35%.

In one embodiment, the present invention provides the foamed material as described above, wherein the specific gravity of the foamed material is less than or equal to 0.13, and the vertical rebound of the foamed material is equal to or more than 70%, and a compression set of the foamed material is less than or equal to 35%.

In one embodiment, the present invention provides the foamed material as described above, wherein the foamed material is used in construction material, transportation cushioning parts, sporting goods or shoe midsoles.

In one embodiment, the present invention provides a method of making a foamed material, comprising the following steps: step 1: mixing and melting any one of the thermoplastic elastomer composition as described above to form compounded granules; step 2: melting and cross-linking the compounded granules to form a cross-linked molded body; and step 3: foaming the cross-linked molded body by a supercritical fluid to form the foamed material.

In one embodiment, the present invention provides the method as described above, wherein the supercritical fluid is nitrogen, carbon dioxide or a mixture thereof.

In one embodiment, the present invention provides a method of making a foamed material, comprising the following steps: step 1: mixing and melting any one of the thermoplastic elastomer composition as described above to form compounded granules, wherein the thermoplastic elastomer composition further comprises a chemical foaming agent; and step 2: melting and cross-linking the compounded granules, during which the compounded granules are foamed to form the foamed material.

Other aspects and various embodiments combined with the above aspects for solving other problems are included in the present invention and will be disclosed in the following detailed descriptions.

DETAILED DESCRIPTION OF THE EMBODIMENTS

The preferred embodiments of the present invention are exemplified below with reference to the accompanying drawings. To avoid obscuring the content of the present invention, the following description may omit conventional components, related materials, and related processing techniques.

Measurement Methods of Various Properties in the Present Invention

Density/specific gravity: measured according to ASTM D792 standard.

Hardness: measured according to ASTM D2240 standard.

Vertical rebound: i.e., the falling ball rebound value, measured according to ASTM D2632 standard.

Compression set: measured according to ASTM D395 standard.

Highest peak molecular weight of the vinyl aromatic based copolymer: measured by gel permeation chromatography, which is a measurement method well known to those skilled in the art.

Vinyl aromatic monomer content of the vinyl aromatic based copolymer: measured by nuclear magnetic resonance analyzer, which is a measurement method well known to those skilled in the art.

Thermoplastic Elastomer Composition for Foaming

The thermoplastic elastomer composition for foaming of the present invention comprises: (A) an ethylene-based copolymer; (B) an olefin block copolymer, which is different from the ethylene-based copolymer; (C) an unsaturated aliphatic rubber; and (D) a crosslinking agent, in which the weight ratio of the unsaturated aliphatic rubber (C) to the olefin block copolymer (B) is 1:1.5 to 1:5.

In a preferred embodiment, the thermoplastic elastomer composition of the present invention does not contain any acrylic metal salt. The acrylic metal salt is prone to agglomerate under high pressure or moisture, and further affects the uniformity of kneading. Moreover, when the temperature is higher than 90° C., the acrylic metal salt will undergo self-polymerization reaction, which will reduce its reactivity with polymers during crosslinking. Therefore, the thermoplastic elastomer composition excluding the use of acrylic metal salt has the characteristics of easy processing.

In a preferred embodiment, the composition comprises 20-45 wt % of the ethylene-based copolymer (A), 30-50 wt % of the olefin block copolymer (B) and 10-25 wt % of the unsaturated aliphatic rubber (C), based on the total weight of the composition. In a particularly preferred embodiment, the composition comprises 30-45 wt % of the ethylene-based copolymer (A), 35-50 wt % of the olefin block copolymer (B) and 10-20 wt % of the unsaturated aliphatic rubber (C). In a more preferred embodiment, the composition comprises 30-40 wt % of the ethylene-based copolymer (A) and 40-50 wt % of the olefin block copolymer (B). In another more preferred embodiment, the composition comprises 15-20 wt % of the unsaturated aliphatic rubber (C).

Ethylene-Based Copolymer (A)

The ethylene-based copolymer (A) is any copolymer containing ethylene as a monomer, in which the content of the ethylene monomer exceeds 50 wt %. Preferably, the ethylene-based copolymer (A) is selected from the ethylene-based copolymers with a carbonyl group and the ethylene-α-olefin random copolymers. For example, the ethylene-based copolymer with a carbonyl group is ethylene/vinyl acetate copolymer, ethylene/methyl methacrylate copolymer, ethylene/butyl methacrylate copolymer, ethylene/butyl acrylate copolymer, ethylene/ethyl acrylate copolymer, ethylene/acrylic acid copolymer, ethylene/acrylic add ionomer or a mixture thereof; and the ethylene-α-olefin random copolymer is ethylene-propylene random copolymer, ethylene-1-butene random copolymer, ethylene-1-hexene random copolymer, ethylene-1-heptene random copolymer, ethylene-1-octene random copolymer, ethylene-4-methyl-1-pentene random copolymer, ethylene-1-nonene random copolymer, ethylene-1-decene random copolymer, chlorinated polyethylene propylene-butylene random copolymer, a modified derivatives thereof or a mixture thereof. Examples of the modified derivatives include those prepared by graft-copolymerizing these copolymers with a modifier, or those prepared by copolymerizing these copolymers with a modifier at the main chain thereof.

Olefin Block Copolymer (B)

The olefin block copolymer (B) comprises a rigid segment composed of repeating units of, for example, ethylene or propylene and a flexible segment composed of repeating units of, for example, α-olefin. The olefin block copolymer (B) is different from the ethylene-based copolymer (A). In a preferred embodiment, the olefin block copolymer (B) is an ethylene-α-olefin block copolymer. The α-olefin may be 1-butene, 1-pentene, 1-hexene, 1-heptene, 1-octene, 1-nonene, and 1-decene, among which 1-octene is preferred. The repeating unit of the α-olefin may be a repeating unit obtained from at least one of the aforementioned α-olefins.

Unsaturated Aliphatic Rubber (C)

The unsaturated aliphatic rubber (C) is a polymer of olefin monomers and/or diene monomers, where unsaturation means that the polymer structure contains at least one double bond. The unsaturated aliphatic rubber (C) is different from the ethylene-based copolymer (A) and the olefin block copolymer (B). Specifically, the unsaturated aliphatic rubber (C) is an ethylene-propylene-diene monomer rubber, butadiene rubber, butyl rubber, isoprene rubber, or a mixture thereof. In a preferred embodiment, the unsaturated aliphatic rubber (C) is a ternary copolymer composed of ethylene monomers, propylene monomers, and a small amount of diene monomers, wherein the diene monomers may have double bonds remaining after polymerization for vulcanization of the rubbers. The diene monomer may be ethylidene norbornene (ENB), vinyl norbornene (VNB), dicyclopentadiene (DCPD), and the content thereof may be 0.5 to 10 wt %.

In a preferred embodiment, the ethylene-based copolymer (A) of the thermoplastic elastomer composition is ethylene/vinyl acetate copolymer or an ethylene-α-olefin random copolymer; the olefin block copolymer (B) of the thermoplastic elastomer composition is ethylene-α-olefin block copolymer; and the unsaturated aliphatic rubber (C) of the thermoplastic elastomer composition is an ethylene-propylene-diene monomer rubber. More preferably, the ethylene/vinyl acetate copolymer has a density range of 0.935-0.955 g/cm$^3$ and a vinyl acetate (VA) content range of 14-35 wt %. The ethylene-α-olefin random copolymer is an ethylene-1-butene random copolymer, an ethylene-1-hexene random copolymer or an ethylene-1-octene random copolymer with a density range of 0.870-0.910 g/cm$^3$ and a hardness range of 70-95 A. The ethylene-α-olefin block copolymer is an ethylene-1-octene block copolymer with a density in the range of 0.860-0.890 g/cm$^3$ and a hardness in the range of 60-85 A. The ethylene-propylene-diene monomer rubber has a density range of 0.870-0.910 g/cm$^3$, an ethylene content range of 60-85% by mass, and a weight average molecular weight range of 100,000 to 200,000.

Crosslinking Agent (D)

The crosslinking agent (D) is an additive with the crosslinking effect, and is generally an organic peroxide. The crosslinking agent (D) is preferably selected from the group consisting of dicumyl peroxide, di-tert-butyl peroxide, 2,5-dimethyl-2,5-di(tert-butylperoxy)hexane, 2,5-di(tert-butylperoxy)-2,5-dimethyl-3-hexyne), di(tert-butylperoxyisopropyl)benzene, 1,1-di-(tert-butylperoxy)-3,3,5-trimethylcyclohexane), butyl 4,4-bis(tert-butyldioxy)valerate, benzoyl peroxide, p-chlorobenzoyl peroxide, 2,4-dichlorobenzoyl peroxide, tert-butyl peroxybenzoate, tert-butylperoxy isopropyl carbonate, diacetyl peroxide, lauroyl peroxide, tert-butyl cumyl peroxide, tert-butylperoxy 2-ethylhexyl carbonate and a mixture thereof. In a further embodiment, the crosslinking agent (D) is 0.1-1 parts by weight, based on 100 parts by weight of the total weight of the ethylene-based copolymer (A), the olefin block copolymer (B) and the unsaturated aliphatic rubber (C).

In another embodiment, a crosslinking aid may be additionally added, such as triallyl cyanurate (TAC) or triallyl isocyanurate (TAIC). In the process of vulcanizing the thermoplastic elastomer with peroxide, the crosslinking aid helps to co-vulcanize with the thermoplastic elastomer, which can improve the crosslinking speed and crosslink density of the thermoplastic elastomer, thereby improving the heat resistance and weather resistance of the elastomer material.

In addition to the above-mentioned components, the thermoplastic elastomer composition of the present invention may further optionally include a vinyl aromatic based copolymer. In a preferred embodiment, based on the total weight of the composition, the content of the vinyl aromatic based copolymer is 3-25 wt %, 5-20 wt %, or 5-10 wt %. More preferably, the highest peak molecular weight of the vinyl aromatic based copolymer is 80,000 to 500,000 grams per mole, more preferably 90,000 to 450,000 grams per mole, and most preferably 90,000 to 350,000 grams per mole. In a still more preferred embodiment, the vinyl aromatic monomer content of the vinyl aromatic based copolymer is 15 to 35 wt %. In the thermoplastic elastomer composition containing the vinyl aromatic based copolymer, a plasticizer may be optionally added. In a preferred embodiment, the weight ratio of the vinyl aromatic based copolymer to the plasticizer is 2:1 to 1:2.

In a preferred embodiment using the vinyl aromatic based copolymer, based on the total weight of the composition, the composition comprises 20-35 wt % of the ethylene-based copolymer (A), 30-45 wt % of the olefin block copolymer (B), 10-20 wt % of the unsaturated aliphatic rubber (C), and 3-25 wt % of the vinyl aromatic based copolymer. In a more preferred embodiment, the composition comprises 35-45 wt % of the olefin block copolymer (B), 15-20 wt % of the unsaturated aliphatic rubber (C), and 5-20 wt % of the vinyl aromatic based copolymer. In another more preferred embodiment, the composition comprises 5-10 wt % of the vinyl aromatic based copolymer.

The monomers of the vinyl aromatic based copolymer are vinyl aromatic monomers and conjugated diene monomers. The conjugated diene monomer suitable for the present invention can be a conjugated diene containing 4 to 12 carbon atoms, and specific examples thereof include: 1,3-butadiene, 1,3-pentadiene, 1,3-hexadiene, 1,3-heptadiene, 2-methyl-1,3-butadiene (isoprene), 2-methyl-1,3-pentadiene, 2-hexyl-1,3-butadiene, 2-phenyl-1,3-butadiene, 2-phenyl-1,3-pentadiene, 2-p-tolyl-1,3-butadiene, 2-benzyl-1,3-butadiene, 3-methyl-1,3-pentadiene, 3-methyl-1,3-hexadiene, 3-butyl-1,3-octadiene, 3-phenyl-1,3-pentadiene, 4-methyl-1,3-pentadiene, 1,4-diphenyl-1,3-butadiene, 2,3-dimethyl-1,3-butadiene, 2,3-dimethyl-1,3-pentadiene, 2,3-dibenzyl-1,3-butadiene, 4,5-diethyl-1,3-octadiene, myrcene, and any combinations thereof, among which 1,3-butadiene and isoprene are the preferred choices. Specific examples of the vinyl aromatic monomers suitable for the present invention include: styrene, methylstyrene and all isomers thereof, ethylstyrene and all isomers thereof, tert-butyl styrene and all isomers thereof, dimethylstyrene and all isomers thereof, methoxystyrene and all isomers thereof, cyclohexylstyrene and all isomers thereof, vinylbiphenyl, 1-vinyl-5-hexylnaphthalene, vinylnaphthalene, vinylanthracene, 2,4-diisopropylstyrene, 5-tert-butyl-2-methylstyrene, divinylbenzene, trivinylbenzene, divinylnaphthalene, tert-butoxystyrene, 4-propyl styrene, 4-dodecylstyrene, 2-ethyl-4-benzyl styrene, 4-(phenylbutyl) styrene, N-(4-vinylbenzyl)-N,N-dimethylamine, 4-vinylbenzyl 2-(dimethylamino)ethyl ether, N,N-dimethylaminomethylstyrene, N,N-dimethylaminoethylstyrene, N,N-diethylaminomethylstyrene, N,N-diethylaminoethylstyrene, vinylxylene, vinylpyridine, diphenylethylene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, indene, diphenylethylene containing tertiary amino groups, such as 1-(4-N,N-dimethylaminophenyl)-1-phenylethylene, and any combinations thereof, among which styrene or methylstyrene and all its isomers are the preferred choice.

The vinyl aromatic based copolymer may be a block, random or taper arranged polymer of two monomers mentioned above or other suitable polymeric monomers, among which the block copolymer is preferred, and the triblock copolymer is more preferred. The vinyl aromatic based copolymer may be selected from non-hydrogenated copolymers, hydrogenated copolymers or a combination thereof. The hydrogenated copolymer may be a partially hydrogenated copolymer (the unsaturated double bond of the conjugated diene monomer having a hydrogenation rate of 10~90%) or a fully hydrogenated copolymer (the unsaturated double bond of the conjugated diene monomer having a hydrogenation rate of >90%). Preferably, the vinyl aromatic based copolymer is the hydrogenated copolymer. The vinyl aromatic based copolymer also includes the linear copolymer, the radial copolymer, the branched copolymer, or the asymmetry copolymer. Preferably, the vinyl aromatic based copolymer is the linear copolymer. Preferred examples of the hydrogenated vinyl aromatic based copolymer are Styrene-Ethylene-Butylene-Styrene (SEBS) block copolymers, Styrene-Ethylene-Propylene-Styrene (SEPS) block copolymers, Styrene-Ethylene-Ethylene-Propylene-Styrene (SEEPS) block copolymers, Styrene-Ethylene-Butylene (SEB) block copolymers, Styrene-Ethylene-Propylene (SEP) block copolymers or various combinations thereof. Preferred examples of non-hydrogenated vinyl aromatic based copolymers are Styrene-Butadiene-Styrene (SBS) block copolymers, Styrene-Isoprene-Styrene (SIS) block copolymers, Styrene-(Isoprene/Butadiene)-Styrene (S-(I/B)-S) block copolymers, Solution Styrene-Butadiene Rubber (SSBR), Styrene-Butadiene (SB) block copolymers, Styrene-Isoprene (SI) block copolymers or various combinations thereof.

The plasticizer is selected from paraffin oil, naphthenic oil, aromatic oil and a composition thereof. In addition, the present invention may also add other processing aid, which is selected from a tackifier, a plasticizer and a melt strength enhancer. The tackifier may be a rosin resin, a petroleum-based resin, a terpene resin or an oligomer. The oligomer is polymerized from a plurality of identical or different structural units. The weight average molecular weight of the oligomer is less than 10,000. Preferably, the oligomer is polymerized from monomers of ethylene, butene, styrene or combinations of the above. The plasticizer is an additive that increases the softness of the material or liquefies the material. The plasticizer is the fatty oil-based plasticizer or the epoxidized oil-based plasticizer. The fatty oil-based plasticizer is glycerin, castor oil, soybean oil, or zinc stearate. The epoxidized oil-based plasticizer is epoxidized soybean oil or epoxidized linseed oil. The melt strength enhancer is an additive that increases the melt strength of materials. The melt strength enhancer is the fluoride-containing compound, among which polytetrafluoroethylene (PTFE) is preferred.

In addition to the above-mentioned components, the thermoplastic elastomer composition of the present invention may optionally comprise a chemical foaming agent. A known and suitable organic foaming agent or inorganic foaming agent may be used. The organic foaming agent may include an azo compound, a nitroso compound, a sulfonyl hydrazide compound, and the like. Specific examples of the azo compound include azodicarbonamide (ADCA), azobisisobutyronitrile (AIBN), diisopropyl azodiformate (DIPA), barium azodicarboxylate (BaAC), diethyl azodicarboxylate (Azoform E), diazoamino benzene, barium azodicarboxylate, etc. Specific examples of the nitroso compound include N,N'-dinitrosopentamethylenetetramine (DPT), N,N'-dinitroso-N,N'-dimethyl terephthalamide (NTA), etc. Specific examples of the sulfonyl hydrazine compound include benzenesulfonyl hydrazine, p-toluenesulfonyl hydrazide (TSH), 4,4'-oxybis(benzenesulfonyl hydrazide) (OBSH), diphenylsulfone-3,3'-disulfonyl hydrazide, benzene-1,3-disulphohydrazide, p-toluenesulfonyl semicarbazide, 4,4'-oxybis (benzenesulfonyl semicarbazide), trihydrazinotriazine (THT), 5-phenyltetrazole, etc. The inorganic foaming agent may include sodium bicarbonate, potassium bicarbonate, sodium carbonate, ammonium bicarbonate, ammonium carbonate, ammonium nitrite, sodium borohydride, and metal powders, etc.

Methods for Manufacturing a Foamed Material

The method for manufacturing a foamed material according to the present invention may be performed by chemical foaming or physical foaming. The chemical foaming may use the thermoplastic elastomer composition containing the chemical foaming agent. The physical foaming is preferred to use thermoplastic elastomer composition containing no chemical foaming agent.

In a preferred embodiment, the method for manufacturing a foamed material by physical foaming includes the following steps: step 1: mixing and melting the thermoplastic elastomer composition as described above to form compounded granules, wherein the thermoplastic elastomer composition does not contain the chemical foaming agent; step 2: melting and cross-linking the compounded granules to form a cross-linked molded body; and step 3: foaming the cross-linked molded body by physical foaming to form the foamed material.

The compounded granules are pellets obtained by kneading and extruding the thermoplastic elastomer composition. The shape of the compounded granules is not particularly limited, and may be a round shape, a sheet/film shape, a strand like, or crumb like. In a more preferred embodiment, the step 2 of the physical foaming further comprises pressing a plurality of the compounded granules into a sheet through calendering process to remove bubbles, and then placing the sheet in a mold for hot pressing, melting and crosslinking to form the cross-linked molded body. In another more preferred embodiment, the step 2 of the physical foaming includes performing hot-pressing and cross-linking by melt-injecting the compounded granules into a mold using an injection machine to form the cross-linked molded body. In a more preferred embodiment, the step 3 of the physical foaming is to impregnate the cross-linked molded body in a supercritical fluid for a period of time and then release the pressure so as to form the foamed material. The supercritical fluid may be carbon dioxide, nitrogen or a mixture thereof.

In a preferred embodiment, the method for manufacturing a foamed material by chemical foaming includes the following steps: step 1: mixing and melting the thermoplastic elastomer composition as described above to form compounded granules, wherein the thermoplastic elastomer composition contains the chemical foaming agent; step 2: placing the compounded granules in a heated mold for melting and crosslinking, during which the compounded granules are foamed to form the foamed material. The shape of the compounded granules is not particularly limited, and may be a round shape, a sheet/film shape, a strand like, or crumb like. In a more preferred embodiment, the step 2 of the chemical foaming further comprises pressing a plurality of the compounded granules into a sheet through calendering process to remove bubbles, and then placing the sheet in the heated mold for hot pressing, melting and crosslinking for molding, during which the chemical foaming agent produces foaming effect to form the foamed material. In another more preferred embodiment, the step 2 of the chemical foaming includes melt-injecting the compounded granules into a mold by an injection machine to perform hot-pressing and cross-linking for molding, during which the chemical foaming agent produces foaming effect to form the foamed material.

The following Examples describe the methods, features, and advantages of the present invention in detail. However, it is not intended to limit the scope of the present invention. The scope of the present invention should be determined by the appended claims.

The components of the thermoplastic elastomer composition used in some examples or comparative examples of the present invention are as follows.

Ethylene-based copolymer (A): Mitsui Tafmer K8505S (marked as POE(A-1) in the table), Mitsui Tafmer DF810 (marked as POE(A-3) in the table), Mitsui Tafmer DF710 (marked as POE(A-4) in the table), Formosa Plastics Ethylene Vinyl Acetate 7470M (marked as EVA(A-2) in the table).

Olefin block copolymer (B): Dow Infuse 9530 (marked as OBC-1(B-1) in the table), Dow Infuse 9107 (marked as OBC-2(B-2) in the table), Dow Infuse 9100 (marked as OBC-3(B-3) in the table).

Unsaturated aliphatic rubber (C): Dow Nordel 4725 (marked as EPDM(C-1) in the table)

Crosslinking agent (D): AkzoNobel BIBP (marked as BIBP(D) in the table)

Crosslinking aid (E): Kettlitz TAC/GR 50 (marked as TAC-50(E) in the table)

Vinyl aromatic based copolymer: TSRC Taipol 6151 (32 wt % of styrene content, 330,000 g/mol of Mp, being marked as SEBS-1 in the tables), TSRC Taipol 6014 (18 wt % of styrene content, 95;000 g/mol of Mp, being marked as SEBS-2 in the tables).

Plasticizer: Idemitsu E-oil (marked as Oil in the table)

EXAMPLE 1

Physical foaming was carried out in Example 1. The ingredients of the composition of Example 1 as shown in Table 1 were dry mixed and put into a 5-liter kneader. The temperature of the machine was set at 100-120° C., and the rotation speed was 40-80 RPM. After the composition was completely melted and compounded evenly for 5-10 minutes, the mixture was put into a granulator for forming the compounded granules. The multiple compounded granules were melted and calendered into a sheet by a double-roller kneader, and the temperature of the roller was 100-120° C. Afterwards, the sheet was placed in the mold to perform cross-linking and molding by hot pressing. The mold temperature was set at 175±2° C., and the time was 390-450 seconds to obtain the cross-linked molded body. The cross-linked molded body was naturally cooled to room temperature to avoid residual stress. Next, the cross-linked molded body was put into the supercritical fluid autoclave, and then the supercritical nitrogen was injected into the autoclave. The saturation temperature was 100-170° C., the saturation pressure was 10-30 Mpa, and the saturation time was 0.5-5 hours. A foamed material was obtained after pressure relief. After the foamed material was left for 24 hours, various physical property tests were conducted.

Please refer to Tables 1-3 for the components of the compositions of Examples 1 to 13 and Comparative Examples 1 to 7, and refer to Example 1 for the remaining steps.

TABLE 1

| Components of the compositions (wt %) | Comparative Example-1 | Comparative Example-2 | Example-1 | Example-2 | Example-3 | Example-4 | Example-5 | Example-6 | Comparative Example-3 |
|---|---|---|---|---|---|---|---|---|---|
| EPDM(C-1) | 20 | 20 | 25 | 20 | 20 | 16 | 14 | 10 | 7 |
| POE(A-1) | 30 | 20 | 0 | 0 | 0 | 0 | 10 | 7 | 10 |
| EVA(A-2) | 40 | 40 | 35 | 45 | 45 | 36 | 31.5 | 33 | 33 |
| OBC-1(B-1) | 10 | 0 | 40 | 0 | 0 | 20 | 20 | 25 | 25 |
| OBC-2(B-2) | 0 | 0 | 0 | 0 | 35 | 28 | 0 | 25 | 25 |
| OBC-3(B-3) | 0 | 20 | 0 | 35 | 0 | 0 | 24.5 | 0 | 0 |
| BIBP(D, phr)* | 0.25 | 0.25 | 0.25 | 0.25 | 0.25 | 0.25 | 0.25 | 0.25 | 0.25 |
| TAC-50(E, phr)* | 0.75 | 0.75 | 0.75 | 0.75 | 0.75 | 0.75 | 0.75 | 0.75 | 0.75 |
| EPDM:OBC | 1:0.5 | 1:1 | 1:1.6 | 1:1.75 | 1:1.75 | 1:3 | 1:3.18 | 1:5 | 1:7 |
| Physical properties | | | | | | | | | |
| Specific gravity (g/cm$^3$) | 0.15 | 0.17 | 0.2 | 0.15 | 0.14 | 0.16 | 0.15 | 0.15 | 0.15 |
| Hardness (Asker C) | 47 | 45 | 58 | 45 | 45 | 49 | 50 | 48 | 49 |
| Vertical rebound (%) | 67 | 66 | 72 | 73 | 74 | 74 | 72 | 72 | 68 |

TABLE 1-continued

| Components of the compositions (wt %) | Comparative Example-1 | Comparative Example-2 | Example-1 | Example-2 | Example-3 | Example-4 | Example-5 | Example-6 | Comparative Example-3 |
|---|---|---|---|---|---|---|---|---|---|
| Compression set (%) | 41 | 45 | 25 | 33 | 30 | 28 | 27 | 26 | 34 |

*The units of components D and E are parts by weight, which are calculated based on a total of 100 parts by weight of other components.

It can be seen from Table 1 that when the weight ratio of the unsaturated aliphatic rubber (C) to the olefin block copolymer (B) is 1:1.5 to 1:5, the foamed material with a specific gravity remaining in a lightweight range of 0.14 to 0.2 g/cm$^3$ (not greater than 0.2 g/cm$^3$), a vertical rebound between 72% and 74% (not less than 70%) and a compression set between 25% and 33% (not more than 35%) can be obtained. The vertical rebound and compression set of Examples 1 to 6 are significantly better than those of Comparative Examples 1 to 3.

TABLE 2

| Components of the compositions (wt %) | Example-7 | Example-8 | Example-9 | Example-10 | Example-11 | Example-12 | Example-13 |
|---|---|---|---|---|---|---|---|
| EPDM(C-1) | 19.4 | 15.75 | 15.75 | 19 | 18 | 15 | 10 |
| SEBS-1 | 3.4 | 2.5 | 10 | 6.7 | 0 | 25 | 0 |
| SEBS-2 | 0 | 7.50 | 0 | 0 | 10 | 0 | 25 |
| Oil | 6.6 | 5 | 5 | 13.3 | 0 | 0 | 12.5 |
| EVA(A-2) | 26.1 | 31.5 | 31.5 | 21.5 | 27.5 | 24 | 22.5 |
| OBC-1(B-1) | 24.2 | 15.75 | 15.75 | 15 | 24.2 | 18 | 15 |
| OBC-2(B-2) | 20.3 | 22 | 22 | 24.5 | 20.3 | 18 | 15 |
| BIBP(D, phr*) | 0.28 | 0.28 | 0.28 | 0.28 | 0.25 | 0.25 | 0.25 |
| TAC-50(E, phr*) | 0.9 | 0.9 | 0.9 | 0.9 | 0.9 | 0.9 | 0.9 |
| Physical properties | | | | | | | |
| Specific gravity (g/cm$^3$) | 0.12 | 0.12 | 0.11 | 0.11 | 0.13 | 0.11 | 0.11 |
| Hardness (Asker C) | 34 | 38 | 36 | 32 | 40 | 30 | 25 |
| Vertical rebound (%) | 75 | 75 | 75 | 74 | 72 | 72 | 70 |
| Compression set (%) | 40 | 35 | 35 | 31 | 30 | 45 | 47 |

*The units of components D and E are parts by weight, which are calculated based on a total of 100 parts by weight of other components.

Table 2 shows examples of the composition having not more than 25 wt % of the vinyl aromatic based copolymer with respect to the total weight of the composition. From Table 1 and Table 2, it can be seen that when the weight ratio of the unsaturated aliphatic rubber (C) to the olefin block copolymer (B) is 1:1.5 to 1:5, by adding the vinyl aromatic based copolymer, the foamed material which is lighter and has a lower specific gravity (0.11~0.13 g/cm$^3$) and remains in a good vertical rebound (not less than 70%), can be obtained. Referring to Table 2, the addition ratio of the vinyl aromatic based copolymers of Examples 7 to 11 is not more than 20 wt % of the total weight of the composition. Compared with Examples 12 and 13, the foamed materials prepared from Examples 7 to 11 have better compression set. With reference to Table 2, the addition ratio of the vinyl aromatic based copolymers of Examples 8 to 11 is 5 to 10 wt % of the total weight of the composition. Compared with Example 7, the foamed materials prepared from Examples 8 to 11 have better compression set.

TABLE 3

| Components of the compositions (wt %) | Example-3 | Comparative Example-4 | Comparative Example-5 | Example-11 | Comparative Example-6 | Comparative Example-7 |
|---|---|---|---|---|---|---|
| EPDM(C) | 20 | 0 | 30.8 | 18 | 0 | 18 |
| SEBS-1 | 0 | 0 | 0 | 0 | 0 | 0 |
| SEBS-2 | 0 | 0 | 0 | 10 | 12.2 | 10 |
| Oil | 0 | 0 | 0 | 0 | 0 | 0 |
| EVA(A-2) | 45 | 56.25 | 69.2 | 27.5 | 33.5 | 27.5 |
| OBC-1(B-1) | 0 | 0 | 0 | 24.2 | 29.5 | 0 |
| OBC-2(B-2) | 35 | 43.75 | 0 | 20.3 | 24.8 | 0 |

TABLE 3-continued

| Components of the compositions (wt %) | Example-3 | Comparative Example-4 | Comparative Example-5 | Example-11 | Comparative Example-6 | Comparative Example-7 |
|---|---|---|---|---|---|---|
| POE(A-3) | 0 | 0 | 0 | 0 | 0 | 24.2 |
| POE(A-4) | 0 | 0 | 0 | 0 | 0 | 20.3 |
| BIBP(D, phr*) | 0.25 | 0.25 | 0.25 | 0.25 | 0.25 | 0.25 |
| TAC-50(E, phr*) | 0.75 | 0.75 | 0.75 | 0.9 | 0.9 | 0.9 |
| Physical properties | | | | | | |
| Specific gravity (g/cm$^3$) | 0.14 | 0.14 | 0.16 | 0.13 | 0.14 | 0.19 |
| Hardness (Asker C) | 45 | 41 | 47 | 40 | 45 | 50 |
| Vertical rebound (%) | 74 | 69 | 69 | 72 | 68 | 69 |
| Compression set (%) | 30 | 44 | 36 | 30 | 40 | 32 |

*The units of components D and E are parts by weight, which are calculated based on a total of 100 parts by weight of other components.

Table 3 shows that the composition containing the unsaturated aliphatic rubber (C) and the olefin block copolymer (B) may have better characteristics. Referring to Table 3, the composition of Comparative Example 4 does not contain the unsaturated aliphatic rubber (C), and the composition of Comparative Example 5 does not contain the olefin block copolymer (B). Compared with Comparative Examples 4 and 5, Example 3 has better vertical rebound and compression set. Example 3 in Table 3 is a composition that does not contain the vinyl aromatic based copolymer. Example 11 in Table 3 is a composition containing the vinyl aromatic based copolymer. Compared with Comparative Example 6 (without the unsaturated aliphatic rubber (C)) and Comparative Example 7 (without the olefin block copolymer (B)), Example 11 has better vertical rebound and compression set.

Physical foaming is a preferred embodiment of the present invention. In addition, it is also possible to add an appropriate amount of the chemical foaming agent to the compositions of the above Examples to perform the chemical foaming procedure for obtaining the foamed materials. Examples of actual practices are as follows.

3.5 parts by weight (based on 100 parts by weight of the ethylene-based copolymer (A), the olefin block copolymer (B) and the unsaturated aliphatic rubber (C)) of UNICELL-D600 MT as chemical forming agent was added into the composition of Example 3, dry mixed and put into a 5-liter kneader. The temperature of the machine was set at 100-120° C., and the rotation speed was 40-80 RPM. After the composition was completely melted and compounded evenly for 5-10 minutes, the mixture was put into a granulator for forming the compounded granules. The multiple compounded granules were melted and calendered into a sheet by a double-roller kneader, and the temperature of the roller was 100-120° C. Afterwards, the sheet was placed in the mold to perform cross-linking and molding by hot pressing. The mold temperature was set at 175±2° C., and the time was 390-450 seconds. During the melting and crosslinking process, the chemical foaming agent produced foaming effect to form the foamed materials.

The present invention further comprises manufacturing the articles which can be used in construction material, transportation cushioning parts, sporting goods or shoe midsoles from the foamed material as described above.

Although the present invention has been disclosed in the above preferred embodiments, it is not intended to limit the invention, and it is possible for those skilled in the art to make alterations and modifications without departing from the spirit and scope of the invention. Therefore, the scope of the invention is defined by the appended claims.

What is claimed is:

1. A thermoplastic elastomer composition for foaming, comprising:
   (A) an ethylene-based copolymer;
   (B) an olefin block copolymer, wherein the olefin block copolymer is different from the ethylene-based copolymer and is an ethylene-1-octene block copolymer, a density range of the ethylene-1-octene block copolymer is 0.860-0.890 g/cm$^3$, and a hardness range of the ethylene-1-octene block copolymer is 60-85A;
   (C) an unsaturated aliphatic rubber, wherein the unsaturated aliphatic rubber is ethylene-propylene-diene monomer rubber, a density range of the ethylene-propylene-diene monomer rubber is 0.870-0.910 g/cm$^3$, an ethylene content range of the ethylene-propylene-diene monomer rubber is 60-85% by mass, and a weight average molecular weight range of the ethylene-propylene-diene monomer rubber is 100,000 to 200,000; and
   (D) a crosslinking agent; wherein a weight ratio of the unsaturated aliphatic rubber (C) to the olefin block copolymer (B) is 1:1.5 to 1:5; and comprising:
      20-45 wt % of the ethylene-based copolymer (A), 30-50 wt % of the olefin block copolymer (B) and 10-25 wt % of the unsaturated aliphatic rubber (C), based on a total weight of the thermoplastic elastomer composition.

2. The thermoplastic elastomer composition of claim 1, wherein the ethylene-based copolymer (A) is selected from an ethylene-based copolymer with a carbonyl group, an ethylene-α-olefin random copolymer and a combination thereof.

3. The thermoplastic elastomer composition of claim 2, wherein the ethylene-based copolymer with a carbonyl group is ethylene/vinyl acetate copolymer, ethylene/methyl methacrylate copolymer, ethylene/butyl methacrylate copolymer, ethylene/butyl acrylate copolymer, ethylene/ethyl acrylate copolymer, ethylene/acrylic acid copolymer, ethylene/acrylic acid ionomer or a mixture thereof.

4. The thermoplastic elastomer composition of claim 2, wherein the ethylene-α-olefin random copolymer is ethylene-propylene random copolymer, ethylene-1-butene random copolymer, ethylene-1-hexene random copolymer, ethylene-1-heptene random copolymer, ethylene-1-octene random copolymer, ethylene-4-methyl-1-pentene random copolymer, ethylene-1-nonene random copolymer, ethylene-1-decene random copolymer, chlorinated polyethylene propylene-butylene random copolymer, a modified derivatives thereof, or a mixture thereof.

5. The thermoplastic elastomer composition of claim 1, wherein the ethylene-based copolymer (A) is ethylene/vinyl acetate copolymer, ethylene-α-olefin random copolymer or a mixture thereof.

6. The thermoplastic elastomer composition of claim 5, wherein the thermoplastic elastomer composition meets at least one of the following conditions: (1) a density range of the ethylene/vinyl acetate copolymer is 0.935-0.955 g/cm$^3$ and a vinyl acetate (VA) content range of the ethylene/vinyl acetate copolymer is 14-35 wt %; (2) the ethylene-α-olefin random copolymer is an ethylene-1-butene random copolymer, an ethylene-1-hexene random copolymer or an ethylene-1-octene random copolymer, a density range of the ethylene-α-olefin random copolymer is 0.870-0.910 g/cm$^3$, and a hardness range of the ethylene-α-olefin random copolymer is 70-95A.

7. The thermoplastic elastomer composition of claim 1, wherein the thermoplastic elastomer composition comprises 0.1-1 parts by weight of the crosslinking agent, based on 100 parts by weight of a total weight of the ethylene-based copolymer (A), the olefin block copolymer (B) and the unsaturated aliphatic rubber (C).

8. The thermoplastic elastomer composition of claim 1, further comprising a vinyl aromatic based copolymer.

9. The thermoplastic elastomer composition of claim 8, comprising 20-35 wt % of the ethylene-based copolymer (A), 30-45 wt % of the olefin block copolymer (B), 10-20 wt % of the unsaturated aliphatic rubber (C), and 3-25 wt % of the vinyl aromatic based copolymer, based on a total weight of the thermoplastic elastomer composition.

10. The thermoplastic elastomer composition of claim 8, wherein a highest peak molecular weight of the vinyl aromatic based copolymer is 80,000 to 500,000 grams per mole.

11. The thermoplastic elastomer composition of claim 8, wherein a vinyl aromatic monomer content of the vinyl aromatic based copolymer ranges from 15 to 35 wt %.

12. The thermoplastic elastomer composition of claim 8, wherein the vinyl aromatic based copolymer is Styrene-Ethylene-Butylene-Styrene (SEBS) block copolymer, Styrene-Ethylene-Propylene-Styrene (SEPS) block copolymer, Styrene-Ethylene-Ethylene-Propylene-Styrene (SEEPS) block copolymer, Styrene-Ethylene-Butylene (SEB) block copolymer, Styrene-Ethylene-Propylene (SEP) block copolymer, Styrene-Butadiene-Styrene (SBS) block copolymer, Styrene-Isoprene-Styrene (SIS) block copolymer, Styrene-(Isoprene/Butadiene)-Styrene (S-(I/B)-S) block copolymer, Solution Styrene-Butadiene Rubber (SSBR), Styrene-Butadiene (SB) block copolymer, Styrene-Isoprene (SI) block copolymer or a combination thereof.

13. The thermoplastic elastomer composition of claim 8, further comprising a plasticizer, wherein a weight ratio of the vinyl aromatic based copolymer to the plasticizer is 2:1 to 1:2.

14. The thermoplastic elastomer composition of claim 1, further comprising a chemical foaming agent.

15. A foamed material, prepared from the thermoplastic elastomer composition of claim 1.

16. The foamed material of claim 15, wherein a specific gravity of the foamed material is less than or equal to 0.2, a vertical rebound of the foamed material is equal to or more than 70%, and a compression set of the foamed material is less than or equal to 35%.

17. The foamed material of claim 15, wherein the foamed material is used in construction material, transportation cushioning parts, sporting goods or shoe midsoles.

18. A method of manufacturing a foamed material, comprising:
step 1: mixing and melting the thermoplastic elastomer composition of claim 1 to form compounded granules;
step 2: melting and cross-linking the compounded granules to form a cross-linked molded body; and
step 3: foaming the cross-linked molded body by a supercritical fluid to form the foamed material.

19. The method of claim 18, wherein the supercritical fluid is nitrogen, carbon dioxide or a mixture thereof.

* * * * *